US012686987B2

(12) United States Patent
Tiboni et al.

(10) Patent No.: US 12,686,987 B2
(45) Date of Patent: Jul. 21, 2026

(54) FOUNDATION STRUCTURE FOR CONSTRUCTIONS

(71) Applicant: Metallurgica Ledrense Società Cooperativa, Ledro (IT)

(72) Inventors: Fabio Tiboni, Ledro (IT); Simone Graffer, Trento (IT); Stefano Menapace, Trento (IT); Lucia Simeoni, Trento (IT); Alessandro Gajo, Venice (IT); Edgar Ferro, Trento (IT); Marco Molinari, Castel Ivano (IT)

(73) Assignee: Metallurgica Ledrense Società Cooperativa, Ledro (IT)

( * ) Notice: Subject to any disclaimer, the term of this patent is extended or adjusted under 35 U.S.C. 154(b) by 114 days.

(21) Appl. No.: 18/568,343

(22) PCT Filed: Jun. 13, 2022

(86) PCT No.: PCT/IB2022/055442
§ 371 (c)(1),
(2) Date: Dec. 8, 2023

(87) PCT Pub. No.: WO2022/259231
PCT Pub. Date: Dec. 15, 2022

(65) Prior Publication Data
US 2024/0279895 A1    Aug. 22, 2024

(30) Foreign Application Priority Data

Jun. 11, 2021    (IT) ........................ 102021000015353

(51) Int. Cl.
E02D 27/02        (2006.01)
F16B 5/02         (2006.01)
            (Continued)

(52) U.S. Cl.
CPC ............ E02D 27/02 (2013.01); F16B 5/0233 (2013.01); E02D 27/42 (2013.01); E02D 27/50 (2013.01);
            (Continued)

(58) Field of Classification Search
CPC ......... E02D 27/02; E02D 27/42; E02D 27/50; E02D 2250/00; E02D 2600/20; F16B 5/0233
See application file for complete search history.

(56) References Cited

U.S. PATENT DOCUMENTS 3,283,518 A * 11/1966 Toffolon ................. E02D 27/16
                                                            405/270
5,860,551 A * 1/1999 Knott, Sr. ........... E02D 29/0208
                                                            220/7
            (Continued)

FOREIGN PATENT DOCUMENTS

CN        102425151 A      4/2012
FR        1 499 996 A      11/1967
            (Continued)

OTHER PUBLICATIONS

Italian Search Report Corresponding to 202100015353 mailed Feb. 25, 2022.
            (Continued)

*Primary Examiner* — Jessie T Fonseca
(74) *Attorney, Agent, or Firm* — Secant IP, P.L.L.C.

(57)        ABSTRACT
A foundation structure (1) for wooden constructions and the like comprises: constructions includes: a footing structure (2), which is designed to be buried to transfer and release the stresses of a superstructure of a construction to the ground and mechanical connection elements (3) for structurally fastening a superstructure of a construction to said footing structure (2), advantageously said footing structure (2) is
            (Continued)

mostly defined by a gabion structure (4) filled with inert material (5) and said mechanical connection elements (3) are firmly fastened to said gabion structure (4) and project upwards from said gabion structure (4).

17 Claims, 8 Drawing Sheets

(51) Int. Cl.
  *E02D 27/42*        (2006.01)
  *E02D 27/50*        (2006.01)

(52) U.S. Cl.
  CPC .. *E02D 2250/00* (2013.01); *E02D 2250/0023*
      (2013.01); *E02D 2300/002* (2013.01); *E02D*
                    *2600/20* (2013.01)

(56)          References Cited

U.S. PATENT DOCUMENTS

2003/0145526 A1* 8/2003 Rothfuss ................. E04C 5/162
                                                  245/2
2005/0286980 A1* 12/2005 Hilfiker .............. E02D 29/0208
                                                  405/262

2021/0002844 A1* 1/2021 Aitchison ............... E02D 27/01
2021/0062451 A1   3/2021 Funakoshi et al.
2024/0093457 A1* 3/2024 Tiboni ............... E02D 29/0208

FOREIGN PATENT DOCUMENTS

| | | | |
|---|---|---|---|
| FR | 2 897 375 | A1 | 8/2007 |
| IT | VR20100 206 | A1 | 4/2012 |
| JP | 2003 227173 | A | 8/2003 |
| JP | 2012 092614 | A | 5/2012 |
| JP | 6572469 | B1 | 9/2019 |
| KR | 2006 0029018 | A | 4/2006 |
| RU | 2073085 | C1 | 2/1997 |
| RU | 2457294 | C2 | 7/2012 |
| RU | 2459908 | C1 | 8/2012 |
| RU | 2704157 | C1 | 10/2019 |
| WO | 91/09513 | A2 | 7/1991 |

OTHER PUBLICATIONS

International Search Report Corresponding to PCT/IB2022/055442 mailed Oct. 10, 2022.
Written Opinion Corresponding to PCT/IB2022/055442 mailed Oct. 10, 2022.
Russian Office Action issued in 2023132999 dated Oct. 31, 2025.

* cited by examiner

FOUNDATION STRUCTURE FOR CONSTRUCTIONS

FIELD OF THE INVENTION

The present invention relates to a foundation structure for constructions adapted for use in the field of building, particularly but without limitation to foundations suitable for wooden buildings and the like.

In a further aspect, the present invention also relates to a method adapted for use in the formation of foundation structures for constructions.

For simplicity, the present disclosure is made by way of illustration and without limitation with particular reference to foundations for wooden constructions of prefabricated type or the like, the same considerations being intended to also refer to other types of constructions.

BACKGROUND OF THE INVENTION

In wooden buildings, as well as in other types of buildings, foundations form an important part of the structure to be constructed in view of ensuring stability and proper support of a superstructure both under static conditions and under dynamic stresses, for example caused by wind pressure and earthquakes.

In particular, minimum requirements to be met by foundations shall concern:

how loads are transferred from the superstructure to the foundations and vice versa, the ability of the foundations to define a substantially monolithic system in absorbing stresses from the superstructure and transferring them to the surrounding soil, and long-term durability of foundations, which is deemed to be the ability of foundations to still work properly and according to design specifications.

Current foundations include a reinforced concrete slab and are constructed by: digging a foundation excavation, laying down a layer of drainage material in the excavation, pouring a first concrete layer (known as "lean concrete") of the order of ten or twenty centimeters, erecting the formwork and placing the reinforcement for the slab and finally pouring concrete, usually by means of a pump.

While these foundations ensure superior performance in meeting the aforementioned needs, they still suffer from certain drawbacks and problems.

It should be noted, for example, that the construction of these foundations requires long preparation and set-up times at the construction site by specially skilled operators, especially for formwork erection and reinforcement of the structure.

It should be also noted that:

in addition to the time for installation of the aforementioned foundations, the minimum number of days required for concrete to set shall be also accounted for, before adding at least a partial load on the foundations by building thereupon;

the construction of these foundations necessarily requires the truck-mounted pumps that will be used for concrete pouring to easily access the construction site and if the constructed structure has to be dismantled, as is the case of temporary structures, the aforementioned foundations are not easily removed from the ground.

With wooden buildings or similar prefabricated buildings, these drawbacks are found to be quite problematic, especially in case of relatively quick construction of buildings to be used for a limited period of time. One example is given by wooden or prefabricated buildings to be constructed after natural disasters, such as an earthquake, which must be ready within a few days and are possibly designed to be later dismantled.

Nevertheless, it shall be understood that the above discussed requirements are also necessarily applicable to such wooden or prefabricated buildings, in spite of their temporary nature, especially concerning proper load transfer from the superstructure to the foundations and vice versa, and the ability of the foundations to define a substantially monolithic system in absorbing stresses from the superstructure and transferring them to the surrounding soil.

In view of the above, at present the need is strongly felt for a foundation system that requires shorter casting times and is also designed to be efficiently and quickly constructed on site by simple placement operations.

Furthermore, there is a strong need to be able to recover and reuse the components of the structure of the foundation system when they are removed.

SUMMARY OF THE INVENTION

This invention is based on the problem of providing a foundation structure for constructions that has such structural and functional features as to fulfill the above needs, while obviating the above-discussed drawbacks of prior art foundations.

This problem is addressed by a foundation structure for constructions as defined in the claim(s).

In a further aspect, the problem is solved by a method as defined in in the claims(s).

BRIEF DESCRIPTION OF THE DRAWINGS

Further features and advantages of the present invention will be apparent from the following description of a few preferred embodiments thereof, which are given by way of illustration and without limitation with reference to the accompanying figures, in which.

DETAILED DESCRIPTION OF INVENTION

Figure 1:
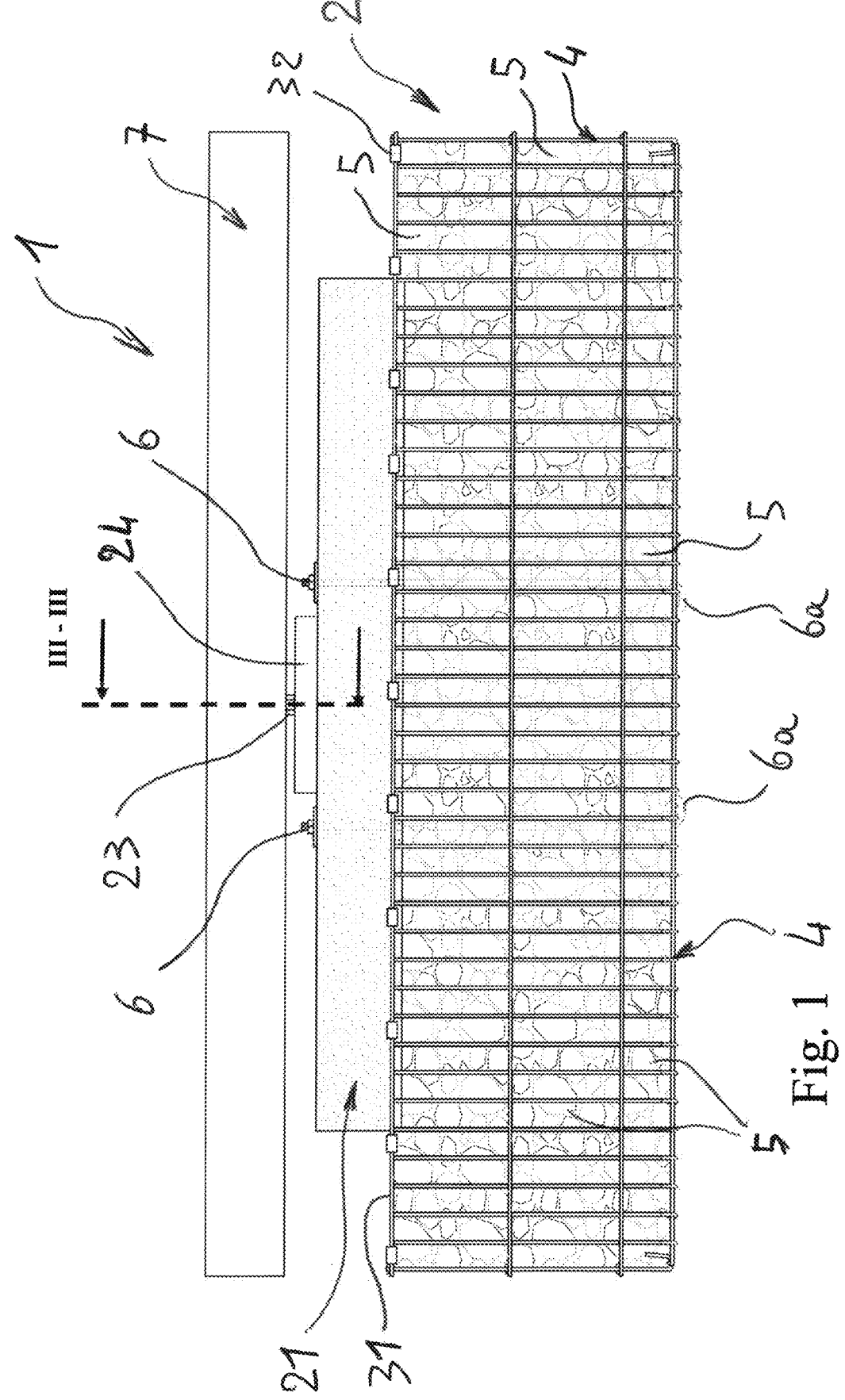
FIG. 1 illustrates a longitudinal cross-sectional view of a foundation structure of the invention comprising a gabion and mechanical connection elements.
Figure 2:
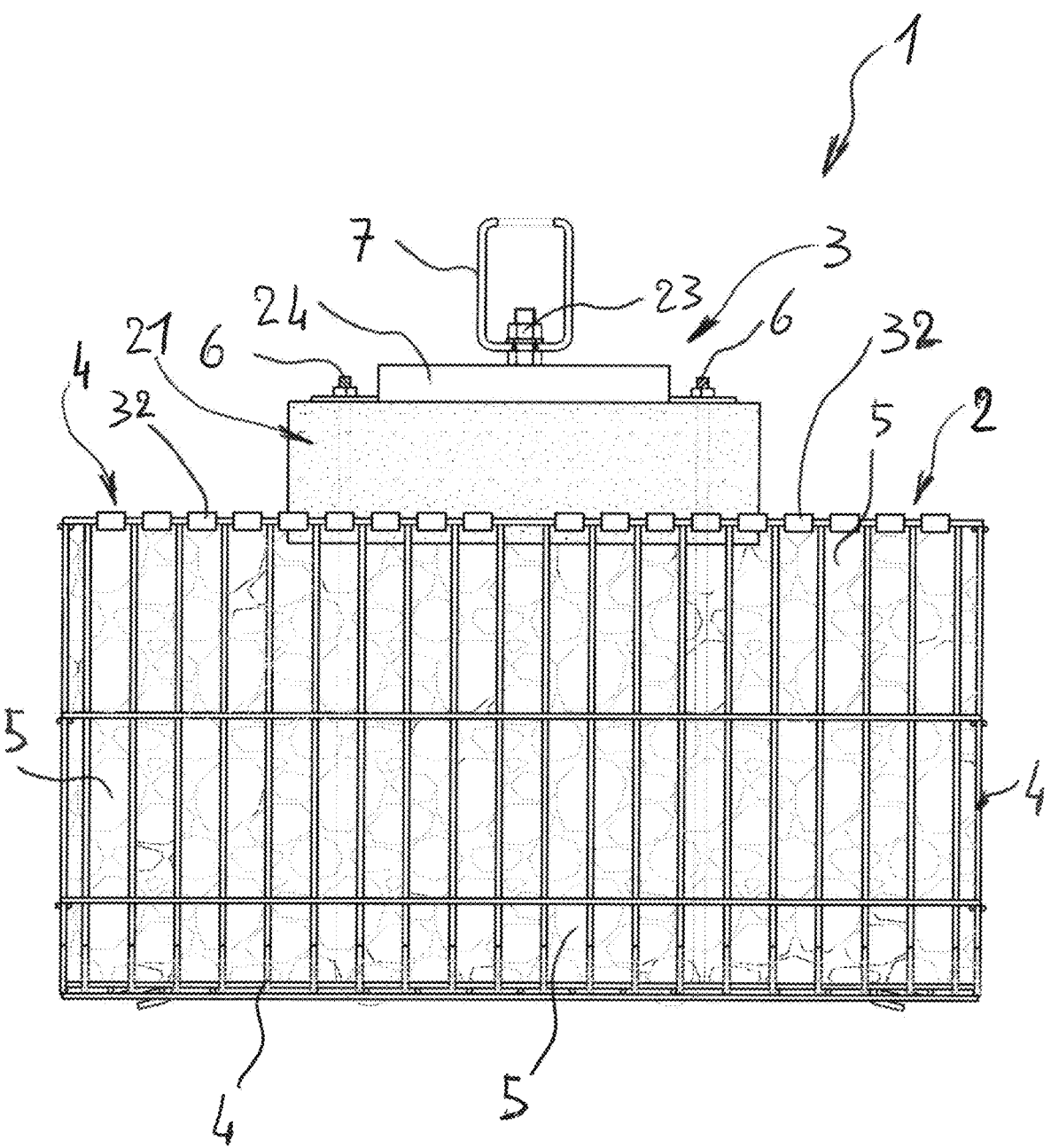
FIG. 2 illustrates a cross-sectional view of the foundation structure of FIG. 1.

Referring to the accompanying figures, numeral 1 generally designates a foundation structure of the invention.

The foundation structure of the invention is particularly suitable for use in the construction of wooden buildings, prefabricated buildings and the like.

The foundation structure 1 comprises:

a footing structure 2, which is designed to be buried to transfer and release the stresses of the superstructure of a construction to the ground and mechanical connection elements 3 firmly fastened to such footing structure 2 to be able to structurally fasten the superstructure of a construction to the footing structure 2.

It should be noted that the aforementioned footing structure 2:

is mostly defined by a gabion structure 4;

is filled with inert material 5 *e* is intended to be placed in a foundation excavation as a dry foundation system, substantially free of any mass casting.

In the aforementioned gabion structure 4 an upper side is provided, which is intended to face the superstructure to be supported when in use. Such upper side of the gabion structure 4 comprises a closing panel 31 which is secured by metal rings 32, e.g. made of aluminum, to the links of the side walls of the gabion structure 4.

It should be noted that the use of metal rings 32 made of aluminum or other suitable alloys, advantageously affords superior strength in terms of easy on-site stapling/clamping of the rings, i.e. when installing the foundation structure, thereby ensuring proper effective connection between closing panel 31 and the vertical panels of the gabion 4. Steel rings with the same strength are not as easily installed and cannot reach the same dimensional limits without causing cracking or weakening in the steel rings. In addition, it should be noted that aluminum is not prone to corrosion, which affords a longer life for these rings and the foundation structure as compared with an identical structure using metal rings made of steel. It should be further noted in this respect that while the use of stainless steel ring can obviate ring corrosion problems, it exacerbates the problems of on-site stapling/clamping, resulting in cracking/weakening.

The aforementioned rings 32 fasten the closing panel 31 to the rest of the gabion structure 4 even under cyclical stresses.

It shall be illustratively noted that, according to a preferred embodiment, the gabions 4 are formed with steel rods having a diameter of 5-8 mm (preferably 6 mm), and have a plan size of the order of 1-2 meters per side (preferably with a 1 m×2 m rectangular base) and preferably a height of the order of 0.5-1 m. By way of example, it should be noted that, according to the preferred embodiment as shown in the figures, the panels that form the gabion are made of electrowelded mesh with double horizontal wires and single vertical wires to form a mesh of about 200 cm×50 cm.

The aforementioned mechanical connection elements 3 are firmly fastened to the gabion structure 4 and project upwards from the upper side of such gabion structure 4.

Preferably, the mechanical connection elements 3 are firmly fastened to the gabion structure 4 by the interposition of a concrete sleeper 21 which is in turn secured to the gabion structure 4 by means of tie rods 6.

Preferably, the aforementioned tie rods 6 engage the gabion structure 4 with a first lower end 6*a*, wherein:

said first end 6*a* of said tie rods 6 engages a lower portion, and preferably engages the bottom, of the gabion structure 4 and/or said first lower end 6*a* of said tie rods 6 defines a hook portion (as shown in the figures), a folded portion or a flange, each designed to be held in position by the gabion structure 4 and at least partially also by the inert material 5 above said first lower end 6*a*.

It should be noted that the figures do not show a foundation structure as a whole but only individual gabions 4 which define a "base unit" of the modular foundation structure of the invention.

Nevertheless, it will be appreciated that the foundation structure 1 of the invention as a whole comprises two or more independent gabion structures 4, for example placed in a foundation excavation substantially in a side-by-side relationship, wherein:

each gabion structure 4 is equipped with respective mechanical connection elements 3, which are fastened with the interposition of a concrete sleeper 21, in turn secured to the gabion structure 4 by means of the aforementioned tie rods 6 and the aforementioned metal rings 32 attached to closing panel 31;

the aforementioned mechanical connection elements 3 of these gabion structures 4 are rigidly fastened to a bracing beam 7, said bracing beam 7 having the purpose of causing said two or more independent gabion structures 4 to form a substantially monolithic unit, as is needed for a foundation structure as a whole.

According to a preferred embodiment, the aforementioned mechanical connection elements 3 may be structurally classified as hinge fasteners, and not as restrained joints, between each gabion structure 4 and the bracing beam 7. Nevertheless, such fasteners may still be implemented as restrained joints if this is required to meet any specific needs.

This allows shear and tensile forces to be transferred to the gabion structure 4, with the moment not being transferred therewith.

According to a preferred embodiment, the foundation structure of the invention comprises:

two or more independent gabion structures 4 aligned with each other in a first direction with their respective mechanical connection elements 4 rigidly fastened by a first bracing beam 7 extending in said first direction and also two or more independent gabion structures 4 aligned with each other in a second direction orthogonal to said first direction, and with their respective mechanical connection elements 3 rigidly fastened by a second bracing beam 7 extending in said second direction, wherein said first bracing beam 7 and said second beam are rigidly connected, so that the forces will be distributed with linear and uniform loads on said beams in one direction or the other, thereby taking advantage of the increased inertia of the foundation system.

Figure 4:
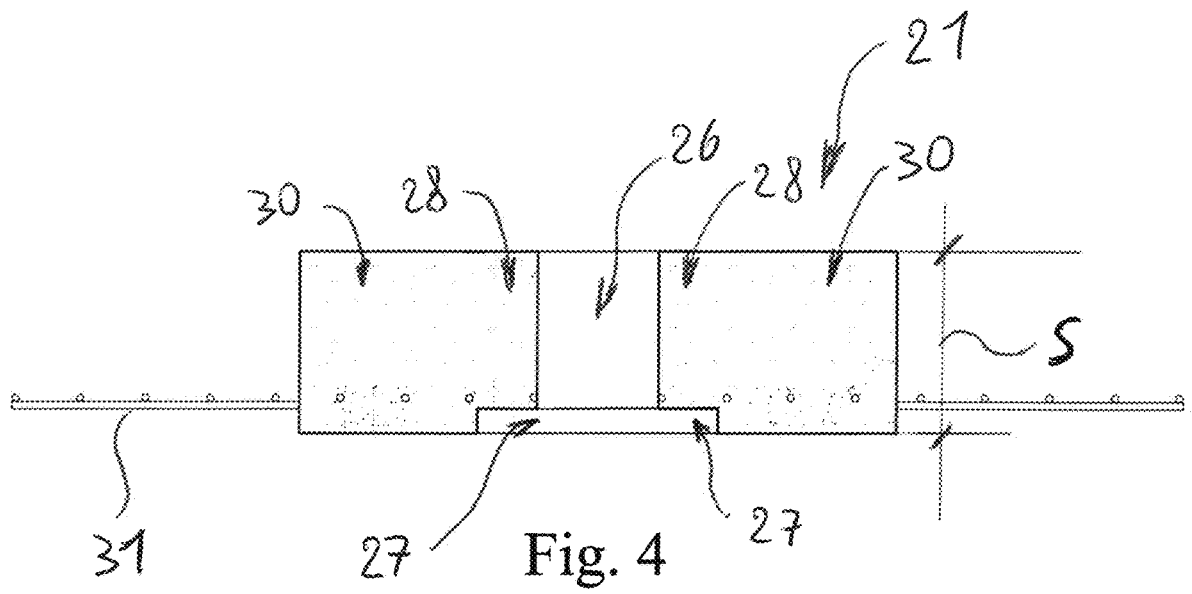
FIG. 4 illustrates a cross-sectional view of the sleeper of the mechanical connection elements.
Figure 5:
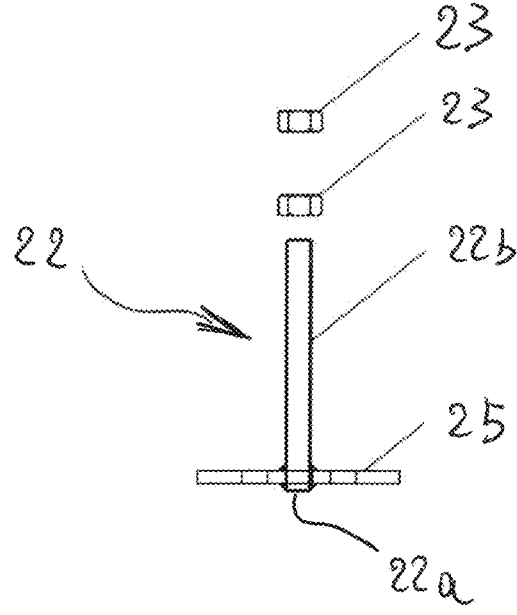
FIG. 5 is a cross-sectional view of connecting bar of the mechanical connection elements and FIGS. 6 to 13 illustrate successive views of the sequence of steps for constructing the foundation structure of FIG. 1.
Figure 6:
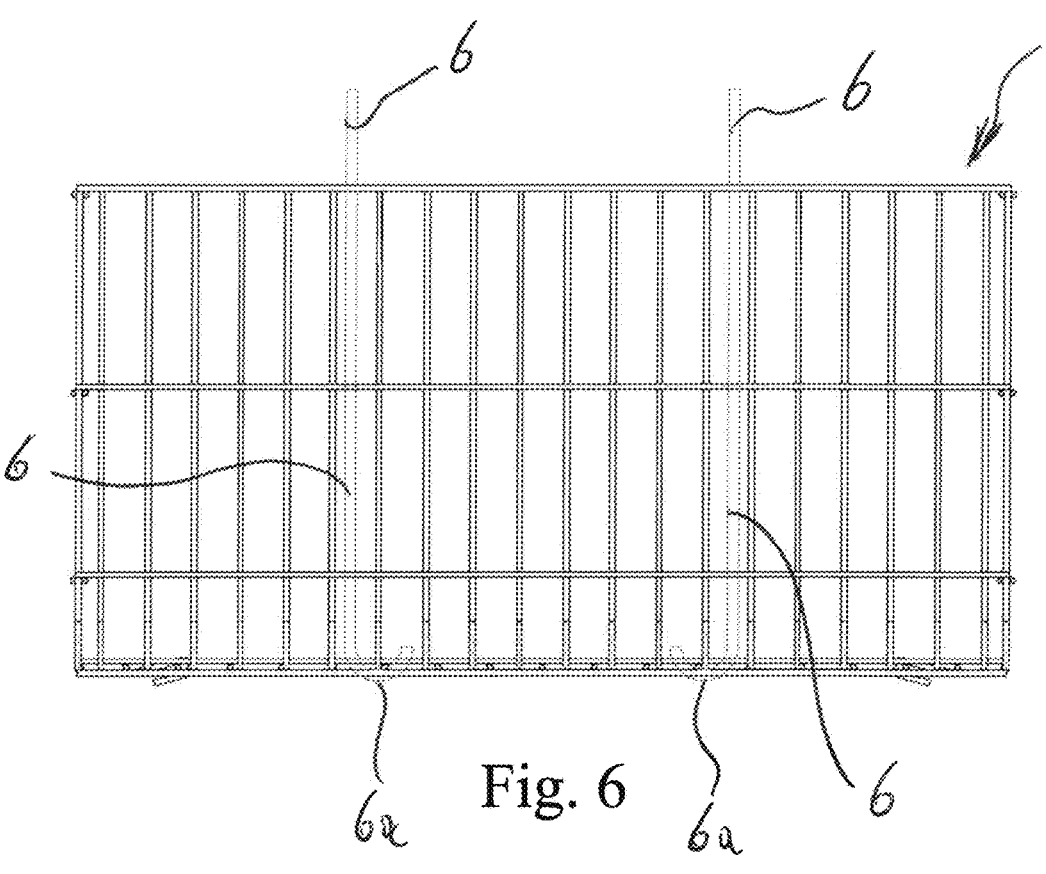
Figure 7:
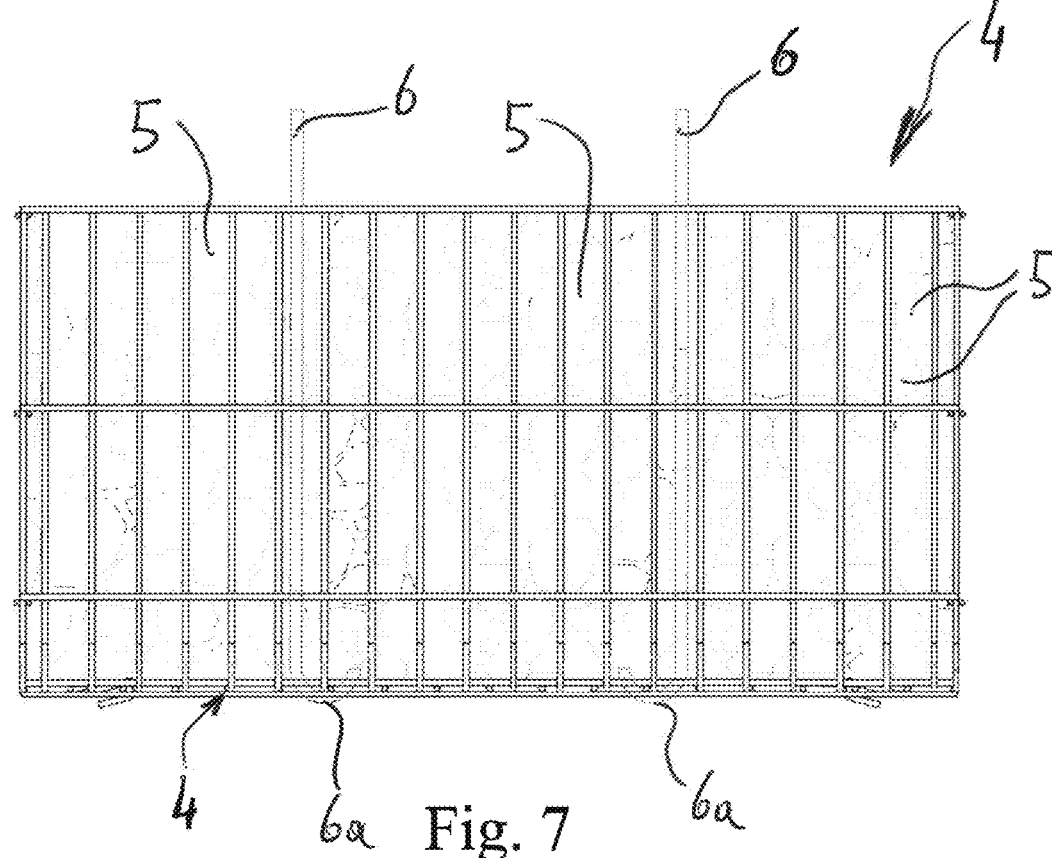
Figure 8:
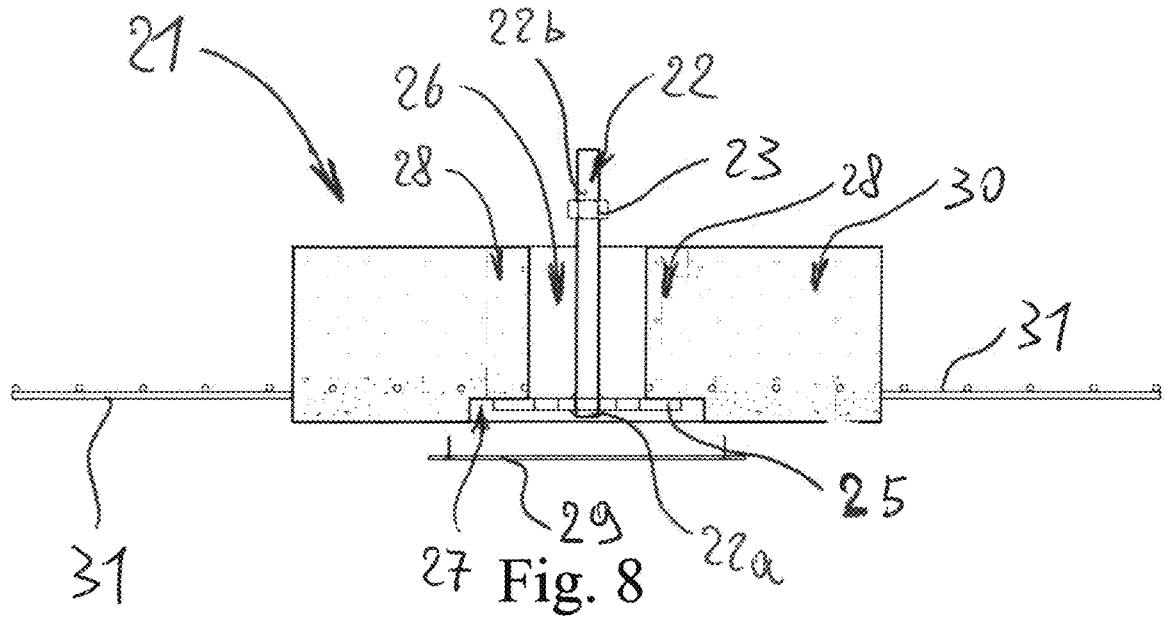

As described above, the embodiment in which the mechanical connection elements 3 may be structurally classified as hinge fasteners, and not as restrained joints, is preferred and advantageous. In this respect, the aforementioned mechanical connection elements 3 for foundation structures may comprise:

a base plate 21 having a predetermined thickness S and designed to be fastened to an underlying foundation structure 2, said base plate 21 particularly comprising therein the closing panel 31 of the gabion which is always formed with steel rods (see FIG. 4), a bracing beam 7 designed to act as a support for a superstructure and a connecting bar 22 (see FIG. 5) having a lower end 22*a* fastened to said base plate 21 and a distal portion 22*b* fastened to said bracing beam 7 by adjustable fastening means 23, to thereby allow adjustment of the distance of said distal portion 22*b* from said lower end 22*a*, and a hardened layer 24 made of a hardenable material having the connecting bar 22 at least partially embedded therein (see FIG. 3), said hardened bearing layer 24 contacting said bracing beam 7 and said base plate 21 to cooperate with said connecting bar 22 in transferring and distributing loads from said bracing beam 7 to said base plate 21. As a result of a number of tests, the aforementioned structure was found to provide mechanical connection elements 3 that structurally behave as hinges and not as restrained joints.

Preferably the aforementioned lower end 22a of the connecting bar 22 comprises a stem and a head 25 radially projecting out of said stem.

According to the preferred embodiment as shown in the figures, the lower end 25 of the connecting bar 22 is defined by a flange, namely a square plate (see FIG. 5), with through holes.

As shown in the figures, the connecting bar 22 projects upwards from the base plate 21 over a section comprising said distal portion 22b.

According to the preferred embodiment as shown in the figures:

the base plate 21 comprises a through hole 26 extending from an upper side facing said bracing beam 7 to an opposite lower side;

this through hole 26 is of such a size as to avoid any interference with the stem of the connecting bar 22 and any interference with the head 25 of the connecting bar 22 and the connecting bar 22 is introduced into said through hole 26 from said lower side of the base plate 21 until the head 25 abuts the lower side of the base plate 21.

Preferably, the lower side of the base plate 21 comprises a housing seat 27 received in the thickness S of said base plate for entirely embedding the head 25 of the connecting bar 22.

Preferably, the head 25 of the connecting bar 22 is received in the housing seat 27 of the base plate 21 with some clearance, so that, before pouring the hardenable material that will: form the hardened layer 24, some positioning/displacement will be allowed in the plane of the head 25 and the connecting bar 22 connected thereto relative to the base plate 21 to mitigate/compensate for any positioning errors.

Preferably, the aforementioned housing seat 27 is closed by a closing plate 29 which is applied after introducing the connecting bar 22 into the through hole 26.

Preferably, the aforementioned closing plate 29 is fixed to the lower side of the base plate 21 by means of concrete nails or other means that can prevent separation and ensure fluid tightness for at least an initial period during which the hardenable material is hardened to form the hardened layer 24, as further explained hereinafter.

Preferably, the aforementioned base plate 21 comprises additional through holes 28 which define air vents to provide fluid communication of said housing seat 27 with the upper side of said base plate 21 when said head 25 of said connecting bar 22 abuts the lower side of said base plate 21. As further explained herein, these through holes 28 allow air to be vented from the housing seat 27 during casting or pouring of the hardenable material that will form the hardened layer 24, to thereby prevent blistering or formation of air pockets within the hardened layer 24.

According to a preferred embodiment, the aforementioned base plate 21 is a reinforced concrete sleeper and, more preferably, consists of a ready-to-use prefabricated concrete sleeper already having:

the through-hole 26, in the illustrated example located in the central position, for the passage of the connecting bar 22, the housing seat 27, the through holes 28 that act as air vents and additional passageways 30 for the tie rods 6 or other hook means for fastening the base plate 21 to the underlying gabion structure 4.

According to an alternative embodiment, the aforementioned base plate is a reinforced concrete sleeper, preferably a prefabricated reinforced concrete sleeper, and said connecting bar:

is embedded in said reinforced concrete sleeper over a first section from said lower end, and projects out of said reinforced concrete sleeper by one end section comprising said distal portion to be fastened to the beam, without prejudice to the presence of the aforementioned hardened layer.

According to a preferred and advantageous embodiment:

the aforementioned connecting bar 22 is a threaded bar and the aforementioned adjustable fastening means 23 comprise a nut and a lock nut mounted in screw engagement on said threaded bar to clamp a portion of the bracing beam 7 therebetween.

Preferably, the connecting bar 22 engages the bracing beam 7 at through openings.

Preferably, the aforementioned hardened layer 24 of hardenable material in which the aforementioned bar 22 is at least partially embedded consists of a casting of a finishing mortar.

As described above, the aforementioned base plate 21 comprises holes 30 for the passage of tie rods 6 for fastening it to an underlying foundation structure 2, but in addition or as an alternative thereto the aforementioned base plate 21 comprises a plurality of tie rods, metal fixing rings or other means for fixation to the underlying foundation structure 2.

With reference to the above, a method of making a foundation structure for constructions comprises the steps of:

forming a foundation excavation;

making a footing structure for foundations in said excavation and providing mechanical connection elements 3 firmly fastened to the aforementioned footing structure 2 to be able to structurally fasten such footing structure 2 to a superstructure of a construction.

Preferably, the aforementioned mechanical connection elements 3 are as described above and structurally form hinge fasteners between the foundation structure and the bracing beam.

Figure 3:
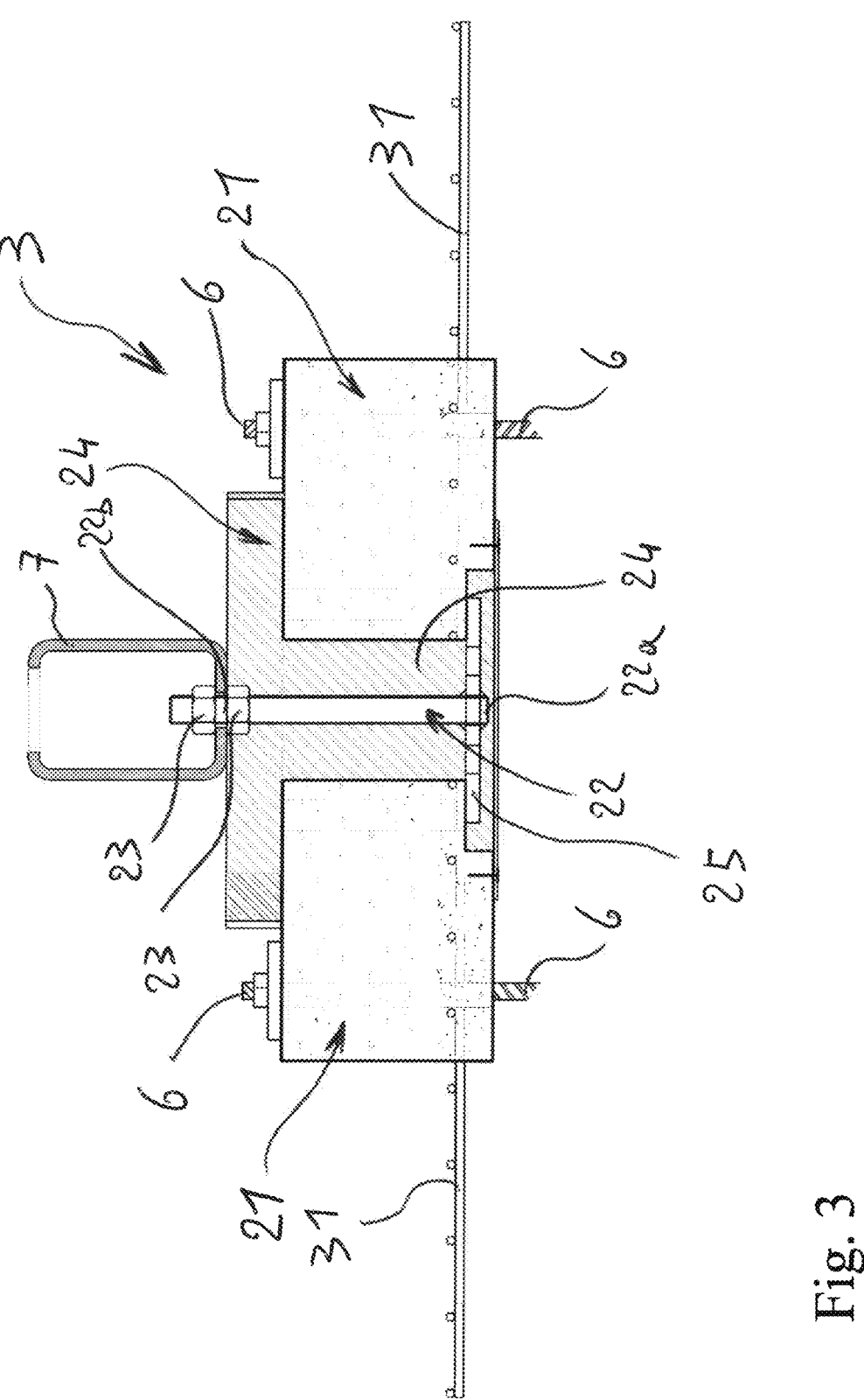
FIG. 3 illustrates a cross-sectional view of the mechanical connection elements and the reinforced concrete sleeper of the foundation structure, as taken along the line III-III of FIG. 1.
Figure 9:
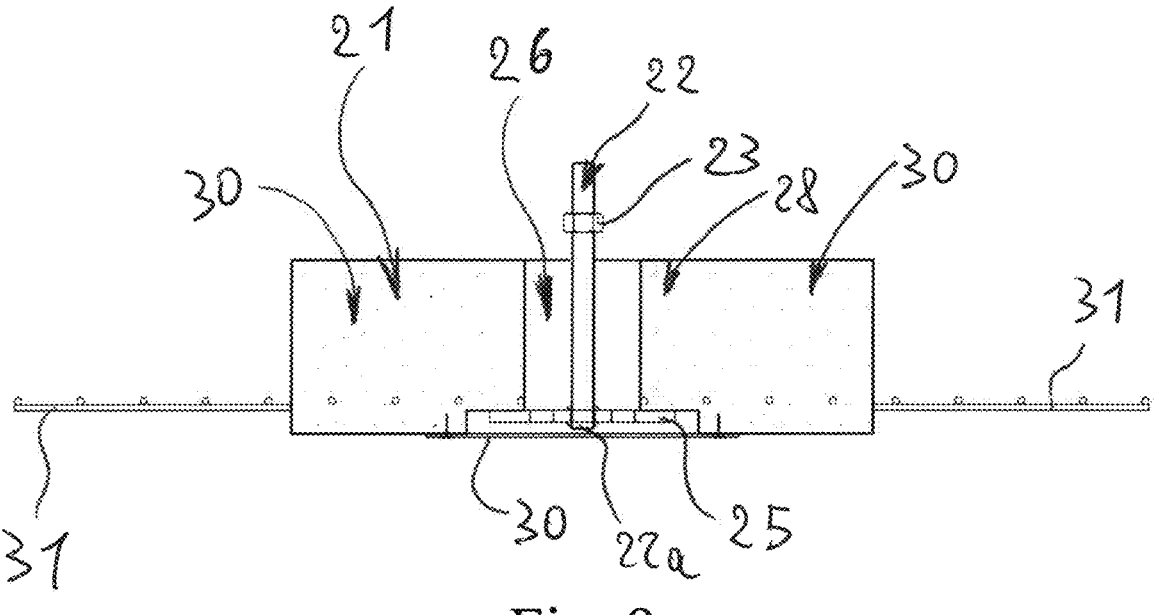
Figures 10, 11:
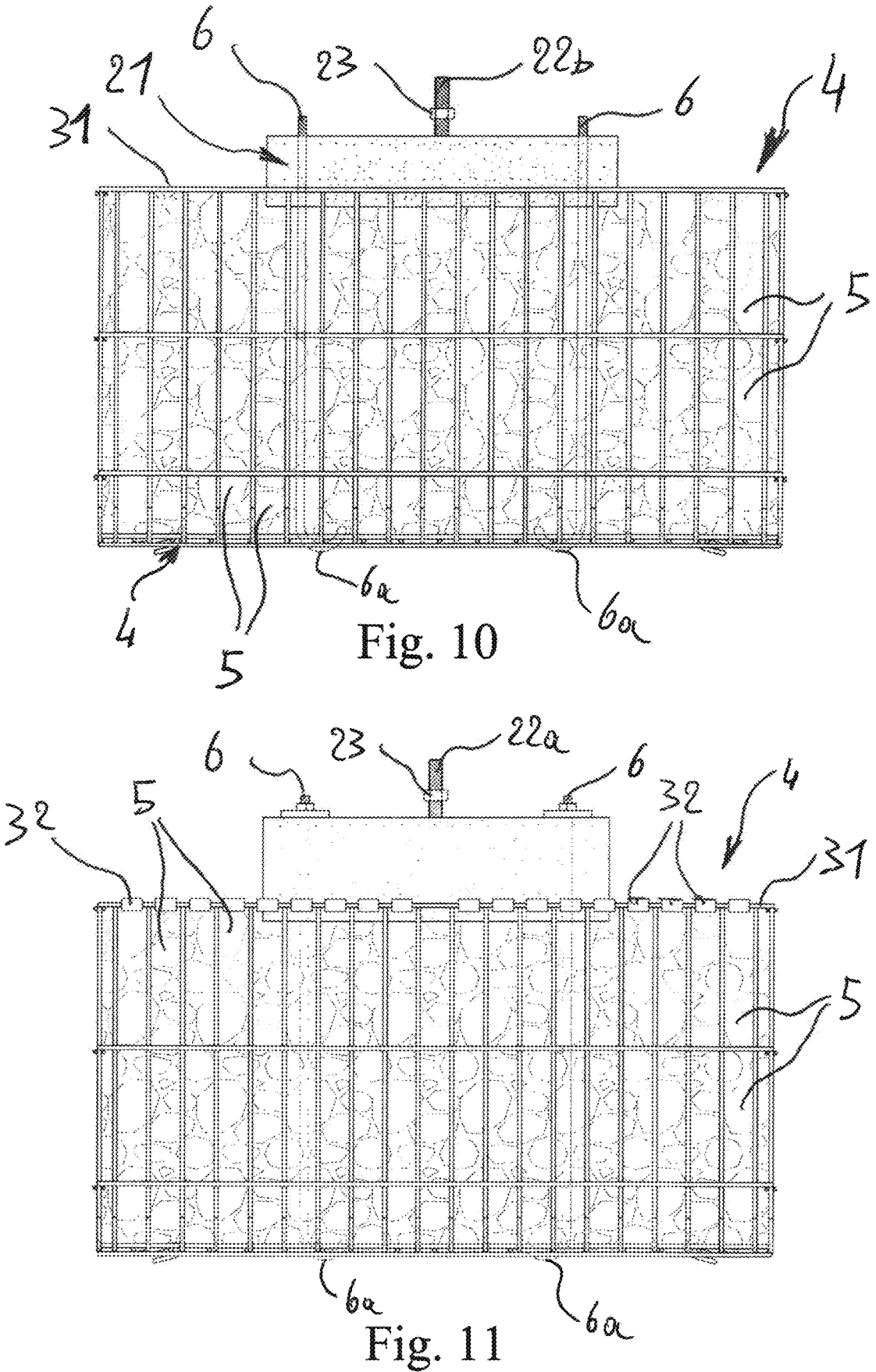
Figures 12, 13:
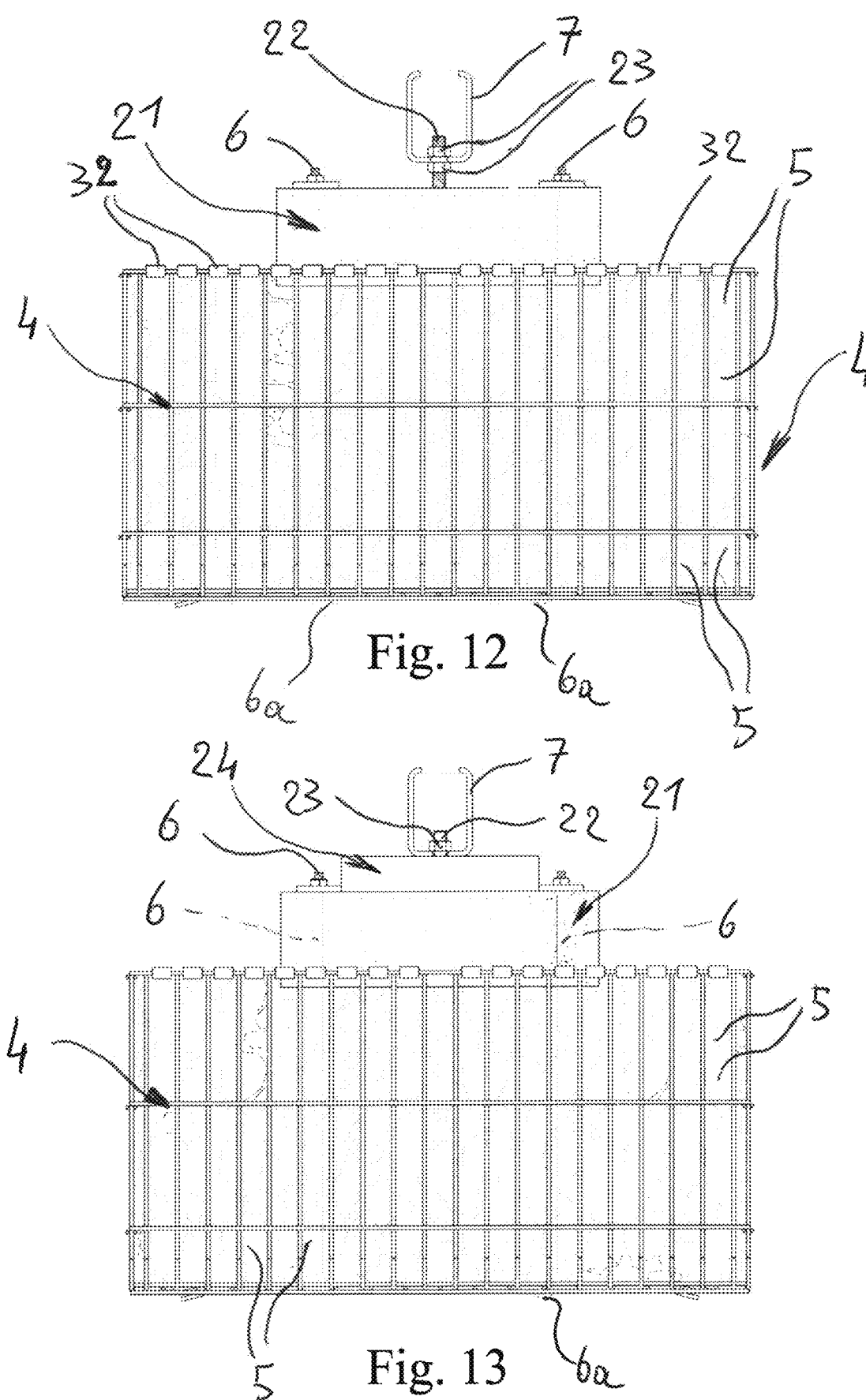

In this case, the aforementioned step of mechanically connecting a gabion structure 4 to a bracing beam 7 by means of the aforementioned mechanical connection elements 3 is carried out by:

providing a base plate 21 having a connecting bar 22 inserted in the through hole 26 and the housing seat 27 closed by the closing plate 29 (see FIG. 9);

placing the aforementioned base plate 21 over the gabion structure 4 (see FIG. 10);

fastening, preferably by means of tie rods 6 and metal rings 32, the base plate 21 to the gabion structure 4 (see FIG. 11);

providing a bracing beam 7 in the desired position and at the desired height (see FIG. 12) and supporting it with a temporary auxiliary support structure;

firmly fastening the connecting bar 22 to such bracing beam 7, by acting on these adjustable fastening means 23, until the head 25 of the connecting bar 22 abuts the lower side of the base plate 21 (see FIG. 12) and, as mentioned above, the head 25 of the connecting bar 22 will be received in the housing seat 27 with some clearance, so that, before pouring the hardenable material that will form the hardened layer 24, some positioning/displacement will be allowed in the plane of the head 25 and the connecting bar 22 connected thereto relative to the base plate 21 to mitigate/compensate for any positioning errors;

providing a formwork above the base plate 21 in the area surrounding the connecting bar 22 and casting a hardenable material, preferably a finishing mortar, into said formwork until it reaches at least the lower height of said bracing beam 7, so that said hardened layer 24 can ensure physical continuity between the bracing beam 7 and the underlying base plate 21 (see FIGS. 3 and 13).

It should be noted that the presence of the aforementioned closing plate 29 applied to the lower side of the base plate 21 prevents, at least until the hardenable material has been partially hardened, any leakage of the hardenable material outside the base plate 21. Once the material of the layer 24 has hardened, the presence of the closing plate 29 is no longer relevant, as such closing plate 29 has no structural function.

It should be noted that, if the base is supplied already set-up/equipped with a connecting bar embedded therein, the aforementioned step of mechanically connecting the gabion structure to a bracing beam by means of the aforementioned mechanical connection elements shall be carried out by:

placing said base plate over the gabion structure;

fastening, preferably by means of tie rods and metal rings, the base plate to the gabion structure, providing a bracing beam in the desired position and at the desired height, by supporting it with a temporary auxiliary support structure;

firmly fastening the connecting bar to the bracing beam, by acting on the adjustable fastening means (as mentioned above, the head 25 of the connecting bar 22 being received in the housing seat 27 of the base plate 21 with some clearance, so that, before pouring the hardenable material that will form the hardened layer 24, some positioning/displacement will be allowed in the plane of the head 25 and the connecting bar 22 connected thereto relative to the base plate 21 to mitigate/compensate for any positioning errors);

providing a formwork above the base plate in the area surrounding the connecting bar and casting a hardenable material, preferably finishing mortar, in the aforementioned formwork until it reaches at least the lower height of said bracing beam.

As described above, the aforementioned footing structure in use is mostly defined by a gabion structure 4 filled with inert material 5, such gabion structure 5 being designed to be placed in a foundation excavation, to thereby define a dry foundation system substantially free of any mass casting.

Here, in the aforementioned method of making a foundation structure, the aforementioned step of making a footing structure for foundations in said excavation comprises the steps of:

placing said gabion structure 4 filled with inert material, vibrated (to promote compaction of the inert material in the volume of the gabion) and closed by the base plate 21, with the connecting bar 22 installed, in the foundation excavation, and mechanically connecting the gabion structure 4 to a bracing beam 7 designed to act as a support for a superstructure, by means of said mechanical connection elements 3.

In the above method, the gabion structure is as described above and is composed of two or more gabion structures 4 with their respective mechanical connection elements 3 rigidly fastened by the same bracing beam 7.

It should be noted that, for improved accommodation of the gabions 4, the foundation excavation may be prepared by pouring a concrete-based layer on its bottom, known as "lean concrete", with the possible provision of elements such as waterproofing barriers to prevent upward infiltration of water/moisture, and the provision of appropriate measures to prevent corrosion of gabions and/or to form crawl spaces.

As clearly shown in the above description, the mechanical connection elements for foundations according to the present invention, as well as the foundation structure for constructions according to the present invention and the method of making same can fulfill the above mentioned needs and also obviate the prior art drawbacks as set out in the introduction of this disclosure.

Thus, for example, it will be appreciated that the mechanical connection elements for foundations according to the present invention, advantageously allow the gabions connected to the same bracing beam to form a monolithic unit, although these gabions are transported and installed independently of each other.

Furthermore, the structure of these connection elements provides a connection between the bracing beam and the footing structure of the foundations that, from a structural point of view, defines a hinge and not a restrained joint, thereby allowing shear and tensile forces to be transferred to the gabion structure, with the moment not being transferred therewith.

Advantageously, the casting to form the aforementioned hardened layer connecting the upper surface of the base plate and the lower surface of the bracing beam affords improved distribution of the stresses from the bracing beam.

It shall be noted that the casting of the hardenable material, preferably a finishing mortar, which is intended to form the aforementioned hardened layer of the aforementioned connection elements is in a small amount and can be made of early-setting material, thereby avoiding the need for long waiting times before loading the bracing beam.

Concerning the foundation structure for constructions of the present invention, it shall be noted that it can be made "dry" i.e. without requiring major mass concrete casting, by placing individual gabions and then filling them with bulk inert materials, preferably having a predetermined particle size, although various stone materials may be used as well as construction debris or other stone, cementitious and similar waste materials whose features are suitable for the purpose in terms of size and nature.

Therefore, the foundation structure for constructions according to the present invention provides a modular structure composed of various components which only need to be partially assembled for placement in a foundation excavation, without requiring major carpentry and reinforcement work.

Another advantage of the foundation structure for constructions according to this invention is the possibility to use a modular structure, which may be easily transported and quickly installed. however, although providing a foundation structure which behaves, as a whole, as a monolithic structure in absorbing stresses from the superstructure and transferring them to the surrounding soil.

A further advantage of the foundation structure for constructions according to this invention is the possibility to recover and reuse the components of the foundation structure as they are removed, for the benefit of circular economy in the construction industry.

Likewise, the method of making a foundation structure for constructions according to the invention can be easily and quickly implemented at a construction site using small concrete casting amounts and almost no carpentry and reinforcement work.

Those skilled in the art will obviously appreciate that, a number of changes and variants may be made to what has been described hereinbefore, without departure from the scope of the invention, as defined in the following claims.

The invention claimed is:

1. A foundation structure for constructions comprising:
a footing structure, which is designed to be buried to transfer and releasing stresses of a superstructure of a construction to the ground, and
mechanical connection elements firmly fastened to said footing structure to be able to structurally fasten the superstructure of the construction to said footing structure,
wherein:
said footing structure is mostly defined by a gabion structure filled with inert material and designed to be placed in a foundation excavation, to thereby define a dry foundation system substantially free of any mass casting;
said gabion structure comprises an upper side, designed to face the superstructure to be supported, which forms a closing panel of said gabion structure;
said mechanical connection elements are firmly fastened to said gabion structure and project upwards from said upper side of said gabion structure;
the foundation structure comprising two or more of said gabion structure that are independent of each other, wherein:
each of said two or more gabion structures has respective said mechanical connection elements firmly fastened thereto by means of respective tie rods and/or metal rings and
said respective mechanical connection elements of said two or more gabion structures are rigidly fastened to a bracing beam such that said two or more gabion structures form a substantially monolithic unit, wherein said respective mechanical connection elements structurally form hinge fasteners interposed between each of said two or more gabion structures and said bracing beam,
wherein:
said two or more gabion structures are aligned with each other in a first direction and the respective mechanical connection elements of said two or more gabion structures are rigidly fastened by said bracing beam extending in said first direction;
said foundation structure comprises a second plurality of two or more gabion structures extending in aligned relationship in a second direction orthogonal to said first direction, wherein the respective mechanical connection elements of said gabion structures of said second plurality of said two or more gabion structures are rigidly fastened by a second bracing beam extending in said second direction; and said bracing beam and said second bracing beam are rigidly connected to each other.

2. A foundation structure for constructions comprising:
a footing structure, which is designed to be buried to transfer and releasing stresses of a superstructure of a construction to the ground; and
mechanical connection elements firmly fastened to said footing structure to be able to structurally fasten the superstructure of the construction to said footing structure;
wherein:
said footing structure is mostly defined by a gabion structure filled with inert material and designed to be placed in a foundation excavation, to thereby define a dry foundation system substantially free of any mass casting;
said gabion structure comprises an upper side, designed to face the superstructure to be supported, which forms a closing panel of said gabion structure;
said mechanical connection elements are firmly fastened to said gabion structure and project upwards from said upper side of said gabion structure;
wherein said mechanical connection elements are firmly fastened to said gabion structure by means of tie rods and/or metal rings; and
wherein said tie rods engage said gabion structure with a first end, wherein:
said first end of said tie rods engages a lower portion of said gabion structure; and/or
said first end of said tie rods defines a hook portion, a folded portion or a flange to be held in position by said gabion structure and/or by the inert material above said first end of said tie rods.

3. The foundation structure as claimed in claim 2 wherein said metal rings are rings made of aluminum or aluminum alloy.

4. A foundation structure for constructions comprising:
a footing structure, which is designed to be buried to transfer and releasing stresses of a superstructure of a construction to the ground; and
mechanical connection elements firmly fastened to said footing structure to be able to structurally fasten the superstructure of the construction to said footing structure;
wherein:
said footing structure is mostly defined by a gabion structure filled with inert material and designed to be placed in a foundation excavation, to thereby define a dry foundation system substantially free of any mass casting;
said gabion structure comprises an upper side, designed to face the superstructure to be supported, which forms a closing panel of said gabion structure;
said mechanical connection elements are firmly fastened to said gabion structure and project upwards from said upper side of said gabion structure;
wherein said mechanical connection elements comprise:
a base plate having a predetermined thickness and designed to be fastened to said footing structure,
a bracing beam designed to act as a support for the superstructure,
a connecting bar having a lower end fastened to said base plate and a distal end fastened to said bracing beam by adjustable fastening means, to thereby allow adjustment of a distance of said distal end from said lower end, and

a hardened layer made of a hardenable material said connecting bar being at least partially embedded therein, said hardened layer contacting said bracing beam and said base plate to cooperate with said connecting bar in transferring and distributing loads from said bracing beam to said base plate.

5. The foundation structure as claimed in claim 4, wherein said lower end of said connecting bar comprises a stem and a head radially projecting out of said stem.

6. The foundation structure as claimed in claim 4, wherein said connecting bar projects upwards from said base plate over a section comprising said distal end.

7. The foundation structure as claimed in claim 5, wherein:

said base plate comprises a through hole extending from an upper side facing said bracing beam to an opposite lower side;

said through hole is of such a size as to avoid any interference with the stem of said connecting bar and any interference with the head of said connecting bar and said connecting bar is introduced into said through hole from said lower side until said head abuts a portion of the lower side of said base plate.

8. The foundation structure as claimed in claim 7, wherein:

the lower side of said base plate comprises a housing seat received in the thickness of said base plate for embedding said head of said connecting bar, and said housing seat is closed by a closing plate once said connecting bar is inserted in said through hole.

9. The foundation structure as claimed in claim 8, wherein said base plate comprises additional through holes which define air vents to provide fluid communication of said housing seat with the upper side of the base plate when said head of said connecting bar abuts the lower side of said base plate.

10. The foundation structure as claimed in claim 4, wherein said base plate is a reinforced concrete sleeper.

11. The foundation structure as claimed in claim 5, wherein said base plate is a reinforced concrete sleeper, and said connecting bar:

is embedded in said reinforced concrete sleeper over a first section from said lower end and projects out of said reinforced concrete sleeper by one end section comprising said distal end.

12. The foundation structure as claimed in claim 10, wherein said base plate comprises said closing panel of said gabion structure embedded therein.

13. The foundation structure as claimed in claim 4, wherein:

said connecting bar is a threaded bar and said adjustable fastening means comprise a nut and a lock nut mounted in screw engagement on said threaded bar to clamp a portion of said bracing beam therebetween.

14. The foundation structure as claimed in claim 4, wherein said hardened layer of the hardenable material in which said connecting bar is at least partially embedded consists of a casting of a finishing mortar.

15. The foundation structure as claimed in claim 4, wherein:

said base plate comprises holes for the passage of tie rods for fastening said base plate to the footing structure and/or a plurality of tie rods are provided for fastening said base plate to the footing structure.

16. A method of making a foundation structure for a constructions, comprising the steps of:

forming a foundation excavation;

making a footing structure for foundations in said foundation excavation and providing mechanical connection elements firmly fastened to said footing structure to be able to structurally fasten said footing structure to a superstructure of the construction, wherein said footing structure is mostly defined by a gabion structure filled with inert material and designed to be placed in said foundation excavation, to thereby define a dry foundation system substantially free of any mass casting, wherein said method comprising the steps of:

positioning said gabion structure, filled with inert material, vibrated and closed by a base plate with a connecting bar installed, in said foundation excavation and mechanically connecting said gabion structure to a bracing beam designed to act as a support for the superstructure, by said mechanical connection elements;

wherein said foundation structure is a foundation structure having the footing structure, which is designed to be buried to transfer and release stresses of the superstructure of the construction to the ground, and the mechanical connection elements are firmly fastened to said footing structure to be able to structurally fasten the superstructure of the construction to said footing structure, wherein the gabion structure comprises an upper side, designed to face the superstructure to be supported, which forms a closing panel of the gabion structure and the mechanical connection elements are firmly fastened to said gabion structure and project upwards from said upper side of said gabion structure;

wherein said step of mechanically connecting said gabion structure to the bracing beam by the mechanical connection elements comprises the steps of:

providing said base plate having the connecting bar inserted in a through hole and a housing seat closed by the closing panel;

placing said base plate over said gabion structure;

fastening said base plate to said gabion structure by means of tie rods;

providing the bracing beam in a desired position and at a desired height, by supporting the bracing beam with a temporary auxiliary support structure;

firmly fastening said connecting bar to said bracing beam by acting on an adjustable fastening means, until a head of said connecting bar abuts against a lower side of said base plate, and casting a hardenable material into a formwork until it reaches at least a lower height of said bracing beam.

17. The method as claimed in claim 16, wherein said step of mechanically connecting said gabion structure to the bracing beam is carried out by said mechanical connection elements, and includes the steps of:

providing the base plate having the connecting bar embedded therein;

placing said base plate over said gabion structure;

fastening said base plate to said gabion structure by means of tie rods and/or metal rings;

providing the bracing beam in a desired position and at a desired height, temporarily supporting the bracing beam with an auxiliary support structure;

firmly fastening said connecting bar to said bracing beam by acting on an adjustable fastening means, until a head of said connecting bar abuts against a lower side of said base plate, and providing a formwork above said base plate in an area surrounding said connecting bar and casting a hardenable material, into said formwork until it reaches at least a lower height of said bracing beam.

* * * * *